United States Patent
Cormier et al.

(10) Patent No.: US 9,670,635 B1
(45) Date of Patent: Jun. 6, 2017

(54) SYSTEM FOR MANAGING RAINFALL

(71) Applicant: VICONIC SPORTING LLC, Dearborn, MI (US)

(72) Inventors: Joel M. Cormier, Lathrup Village, MI (US); Richard F. Audi, Dearborn, MI (US); Donald S. Smith, Commerce, MI (US)

(73) Assignee: Viconic Sporting LLC, Dearborn, MI (US)

( * ) Notice: Subject to any disclaimer, the term of this patent is extended or adjusted under 35 U.S.C. 154(b) by 0 days.

(21) Appl. No.: 15/003,826

(22) Filed: Jan. 22, 2016

(51) Int. Cl.
  *E02B 11/00* (2006.01)
  *E01C 13/08* (2006.01)
  *E01C 11/24* (2006.01)

(52) U.S. Cl.
  CPC .............. *E02B 11/00* (2013.01); *E01C 11/24* (2013.01); *E01C 13/083* (2013.01); *E01C 2013/086* (2013.01)

(58) Field of Classification Search
  USPC ...... 405/43, 44, 45; 52/168, 783.17, 783.19, 52/789.1, 11; 47/65.6, 65.7, 65.9, 66.1
  See application file for complete search history.

(56) References Cited

U.S. PATENT DOCUMENTS

| | | | |
|---|---|---|---|
| 6,237,285 B1 * | 5/2001 | Yoshida | A01G 1/007 47/65.9 |
| 8,272,163 B2 | 9/2012 | Dubner | |
| 2003/0082359 A1 * | 5/2003 | Scott | E01C 13/02 428/221 |
| 2009/0188172 A1 | 7/2009 | DuCharme et al. | |
| 2011/0030291 A1 | 2/2011 | Whitfield | |
| 2014/0186118 A1 * | 7/2014 | Marissen | E01F 7/02 405/16 |
| 2014/0311074 A1 * | 10/2014 | Cormier | E04F 15/225 52/403.1 |

FOREIGN PATENT DOCUMENTS

EP  2322726 B1  7/2012

OTHER PUBLICATIONS

Bloomberg, Michael R.; Guidelines for the Design and Construction of Stormwater Management Systems; pp. 69-71; Fig. 4-3; Jul. 2012.
Nophadrain®; Smart Green Roof Systems; Section 3.1-3.2 and "Construction of an Extensive Green Roof".

* cited by examiner

*Primary Examiner* — Sean Andrish
(74) *Attorney, Agent, or Firm* — Brooks Kushman P.C.

(57) ABSTRACT

A modular precipitation or rain water retention system having one or more interconnected reservoir retention modules that cooperate to manage effluent from a precipitation event. At least some of the modules are configured to retain an initial amount of rainfall and then meter out the rain water. Each module has one or more frustoconical support structures joined by hollow interconnecting ribs that create a reservoir so that within each reservoir, wells are defined for rainwater retention. At least some of the frustoconical support structures have tops that may underlie a secondary system such as a green layer.

16 Claims, 9 Drawing Sheets

SYSTEM FOR MANAGING RAINFALL

TECHNICAL FIELD

Several embodiments of this disclosure relate to devices and methods for storing and progressively releasing rainwater or melted ice and snow that fall on a substrate such as a roof or other receiving surface such as a walkway, roadway, playground or sports arena.

BACKGROUND

Heavy rain events occur in both rural and urban areas. In rural settings, the ground is often able to absorb a substantial percentage of the precipitation to the point where the ground becomes saturated. Then runoff occurs, with consequent loading of municipal infrastructures, if present. In urban environments, the surface on which the precipitation falls is often man-made and impermeable. These relatively impermeable surfaces include parking lots, streets and roof tops which must manage nearly the entire volume of precipitation that falls onto these surfaces. While streets and parking lots have drains and systems to channel and funnel the rainfall, these systems can quickly become overwhelmed when rain events exceed one inch over a short period of time. As a result, the burden falls on the municipal wastewater or sewer system to manage the great majority of the effluent.

Rooftops in particular retain and transfer almost 100% of the rain during a rain event. New building codes often require that commercial roofs need to retain a specific volume of water per unit area of the roof. A system located either directly on the roof or in a separate structure, is therefore required to store this volume and slowly release this volume into either the environment, a wastewater facility or the sewer system over a period of time in an effort to lessen the burden on these systems. The cost of added real estate for a retention pond or a cistern to temporarily store the rainfall substantially increases the cost of construction.

Against this background, it would be desirable to provide a method and system for managing rainfall that has the following features:

Has a minimal installed cost;
Is compatible with the impermeable roofing membrane;
Is capable of retaining for example 1.6" of rainfall to meet relevant building codes;
Is capable of slowly leaching out 1.6" of rainfall over a 24 hour period;
Requires no additional effluent retention system;
Provides some cooling or insulation to the building;
Enhances (or does not diminish) the overall appearance of the property;
Meets all building codes and requirements;
Provides additional protection against hail and the elements; and
Requires little to no maintenance.

Conventionally, many flat roofing systems are typically surfaced with an impermeable layer. Typically the material is rubberized for ductility and is supplied in rolls that are seamed together with specialty primers and adhesives. These materials have exhibited durability to cold, heat and UV light. The manufacturers generally warranty such roofing systems for 20 years. When installed properly, the roof is impermeable and graded to channel water into drains or spouts that transfer the water from the roof surface.

In recent years, it has been shown that installing a secondary system over the primary rubberized roofing material can provide added benefits to building construction and maintenance costs.

Ford's Rouge Factory in Dearborn, Mich. installed a sedum terrarium on the roof that both absorbs excess rainfall and provides a heating and cooling benefit to the facility. Natural grass and other varieties of plants can also serve a similar function. More light is absorbed by the plants during summer months and evaporative cooling lessens the burden on facility cooling systems. During winter months, the material acts as an added layer of insulation. However, these organic materials can become a fire hazard when and if a drought causes the vegetation to die or becomes dormant during the dry spell.

A thermoplastic drainage/water retention member is often installed between the roof surface and the green roof growing medium/plants. U.S. Pat. No. 8,272,163 describes a modular interlocking pre-vegetated roof system. The system is comprised of individual trays with a plurality of reservoirs designed to retain water for plant growth. The system retains water but water is prevented from flowing through the reservoirs and onto the roof. An overflow drain is provided on the top surface when the growing medium is saturated. While the system retains a great deal of water, the reservoir retains very little water, relying mainly on the growing medium to retain the water.

An alternative system involves installing an artificial turf surface over the traditional rubberized roofing material. These systems not only enhance the aesthetic appearance of the roof but can also be engineered with infill or other materials that absorb and retain a percentage of the rainfall. They also act as the primary UV light-absorbing surface, as opposed to the rubberized roofing, and extend the life of the rubberized layer. However, these systems are generally heavy and can add several pounds per square foot to the roofing surface. They also require large amounts of infill material in order to gather, retain, and eventually evaporate enough moisture to combat a deluge of more than an inch of rain that generally taxes the municipal sewer system. Once these systems become saturated, they fail to function effectively and add substantial bearing weight to the roof.

Generally, the typical roofing system transfers nearly all the moisture that falls on the surface to the downspouts and roof drains that then transfer the burden to either a secondary water retention system or the municipal sewer system.

Among the art considered before filing this application are the following references: U.S. patent publication Nos. 2009/0188172; 2011/0030291; U.S. Pat. No. 8,272,163; European patent No. EP2322726. Also considered were the following publications: Guidelines for the Design and Construction of Stormwater Management Systems (pp. 69 & 71; FIG. 4-3); and Nophadrain Smart Green Roof Systems (Section 3.1-3.2 and "Construction of an Extensive Green Roof").

DETAILED DESCRIPTION

As best shown in FIGS. 1-6 & 8, one aspect of this disclosure involves a modular precipitation or rain water retention system 10 with interconnected preferably one or more thermoplastic reservoir retention modules 12 that cooperate to manage effluent from a precipitation event. Each module 12 has the ability to retain an initial amount of rainfall and then slowly meter out or leach out the water over a period of time. Each module 12 is comprised of an array of preferably generally frustoconical structures 14 joined by hollow interconnecting ribs 16 that create a reservoir. As used herein, the term "frustoconical" generally describes a cone with the tip removed. The term also includes a structure which has multiple lobes (e.g., four), is curvilinear, and hollow. The term "curvilinear" conveys that when viewed from a side, a frustoconical structure may have linear sidewalls. But when viewed from above or below, the ends of the frustoconical structures appear to be curved, circular, oval or elliptical. Within each reservoir, the ribs 16 connect the frustoconical structures 14 that define as both wells 18 and support pillars 20. The support pillars 20 rise from a base 22 and are engineered to support the weight of a 250 lb. person without collapsing. In the preferred embodiment, the tops 24 of frustoconical structures 14 interact with a secondary system 26, such as an artificial turf. The substantially planar base surface 22 is roughly parallel to the cone tops 24.

Each module 12 contains one or more metered drainage provisions 26 in either the exterior sidewall 28 of the reservoir module 12 and/or the pillars 20 that permit water to slowly seep onto the rooftop surface 30 over time without infill or absorbing media positioned inside the reservoir. The drainage provisions 26 include but are not limited to holes 30 from 0.5 to 1.5 mm in diameter and narrow slots 32 (some material removed), or slits (no material removed). In the preferred embodiment, each module 12 has a plurality of longitudinal slits 32 on the sidewalls 28 of the module 12. These slits 32 allow water to seep from the reservoir 12 at a slow rate and have the capability of being openable in response to an applied load.

Figure 7:
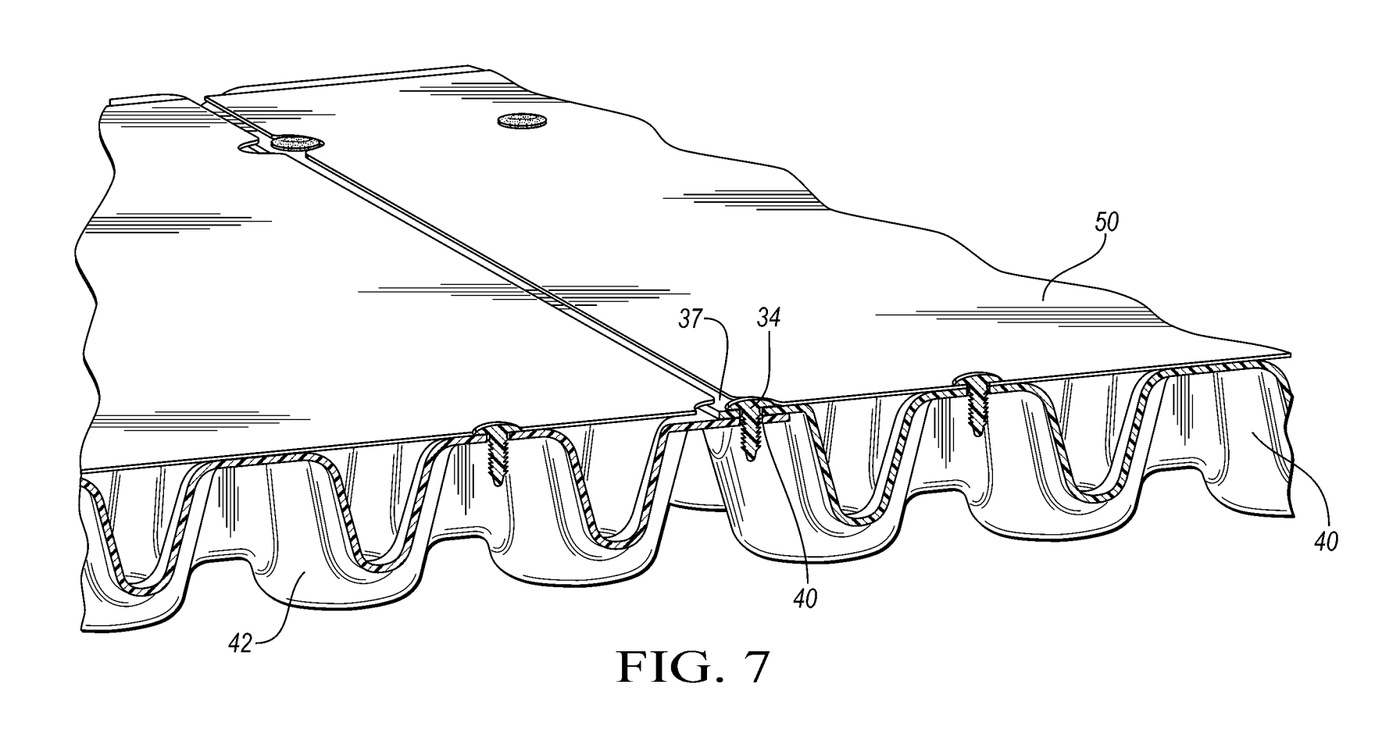
FIG. 7 is a sectional view of the arrangement depicted in FIG. 6 taken along the line 7-7 thereof.
Figure 8:
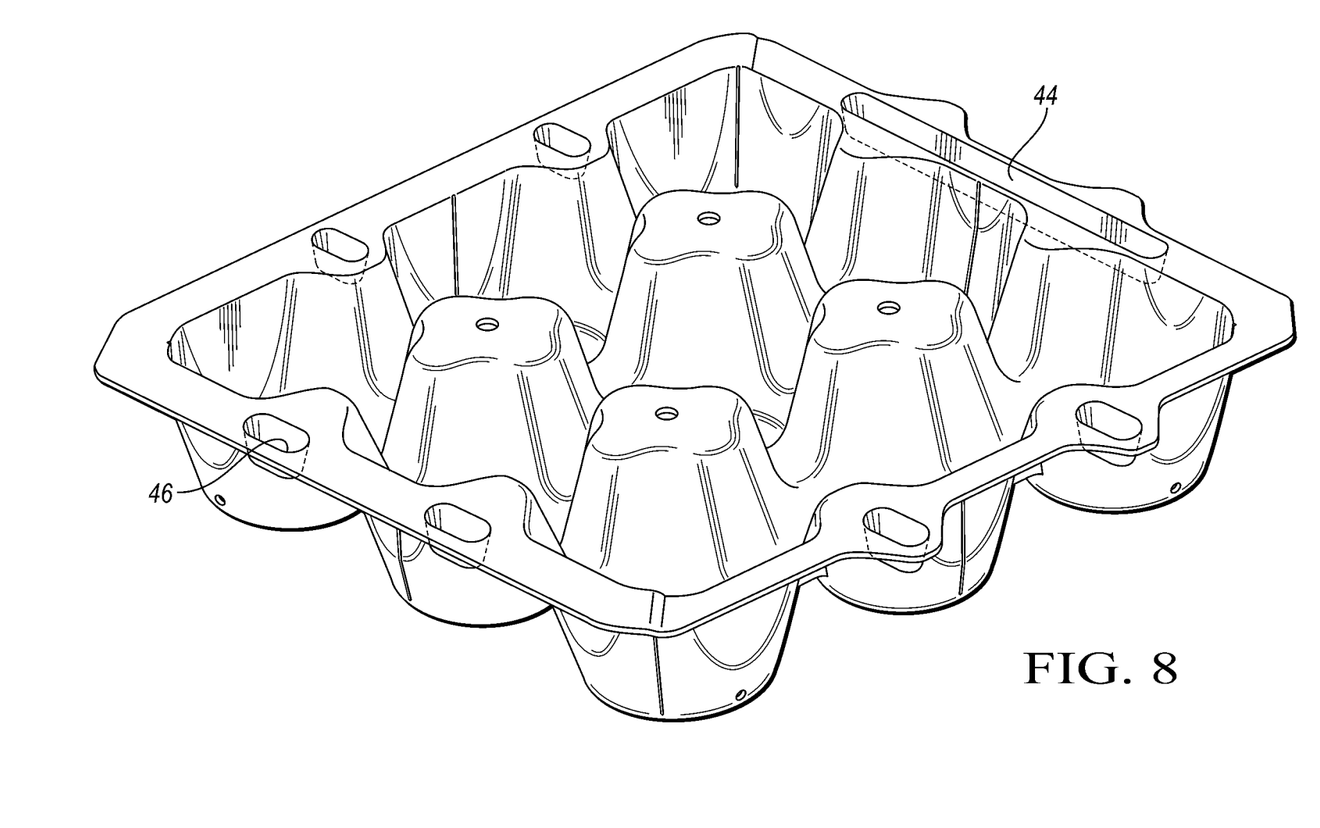
FIG. 8 is a quartering perspective view of an embodiment of the retention system resembling that depicted in FIG. 1, further including elongated engagement apertures that accommodate thermal expansion.

In the preferred embodiment (FIG. 7), the modules 12 coordinate and connect to one another in two main ways. A first way involves means for attaching such as "Christmas Tree" fasteners 34. It will be appreciated by those skilled in the art that other joining techniques such as push pins, rivets, bolts, screws, and adhesives are alternate means for attaching adjacent modules 12 together. Fasteners 34 are installed through holes 36 in a peripheral flange 37 of adjacent modules 12. The peripheral flange 37 of the top module 40 (FIG. 7) is provided with a clearance hole 38 (FIG. 1) that does not engage attachment means such as the "branches" of the Christmas tree fastener 34, thereby allowing for thermal expansion and contraction. The peripheral flange 37 of the lower overlapped module 42 (FIG. 7) has a tighter hole 36 that interacts with the branches of the fastener 34 that affixes one module 12 to the next.

Figure 9:
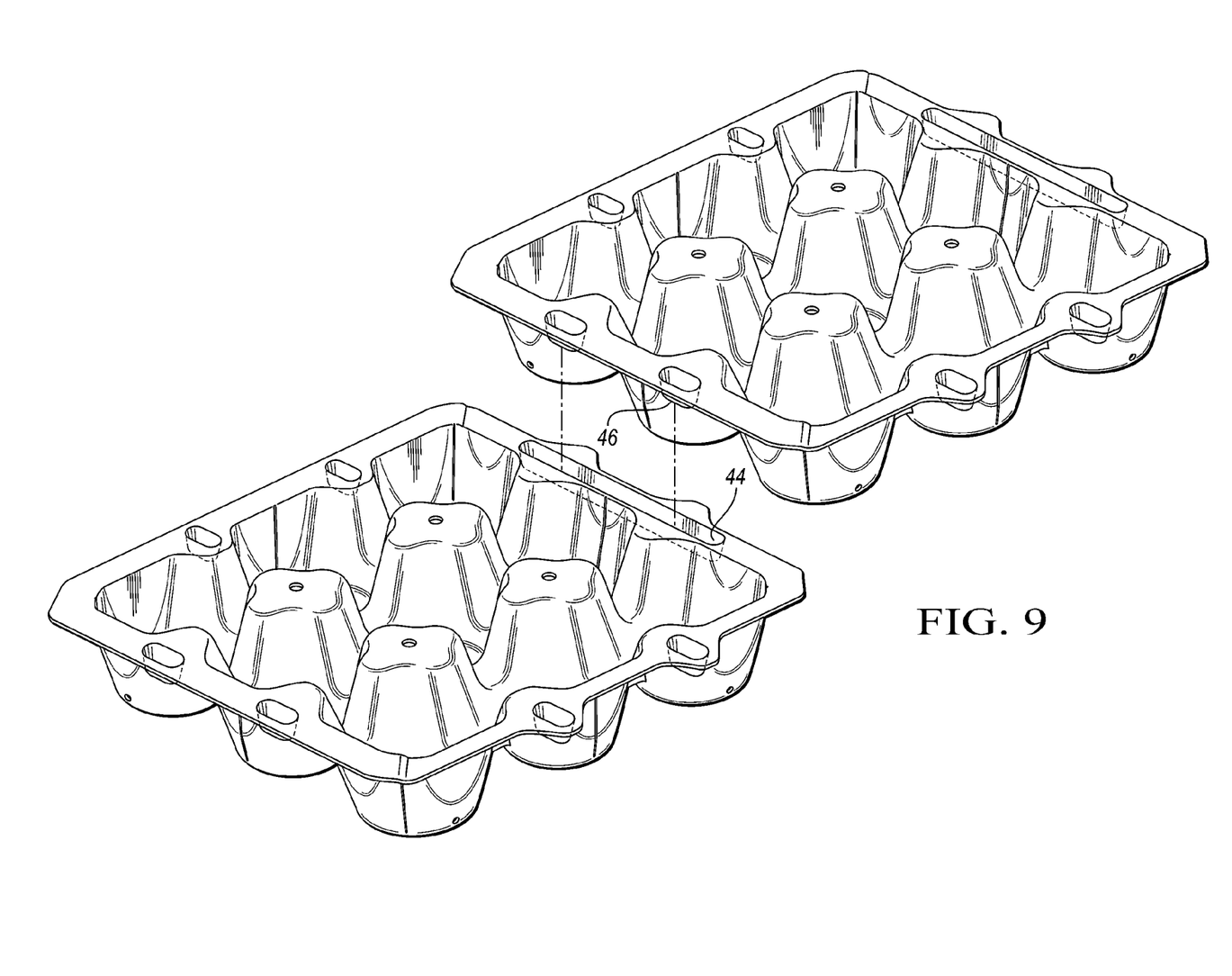
FIG. 9 is an exploded view which depicts one way in which two adjacent retention system modules may become interlocked.

A second way of attaching adjacent modules 12 involves providing oval female recesses 44 (FIGS. 8, 9) that engage male protuberances 46 of an adjacent module. The oval female recesses 44 are oriented so that they are preferably aligned with a direction of thermal expansion. When a male protuberance 46 is engaged thereby, unidirectional relative movement therebetween can be accommodated. If desired, lugs and grooves (not shown) can be provided in the male 46 and female 44 members to offer a snap-fit engagement mechanism between adjacent modules.

The modular retention system 10 may include a number (n) of modules 12 (where 1<n<1,000,000) depending on the footprint on the roof 30 over which the system is installed.

Figure 1:
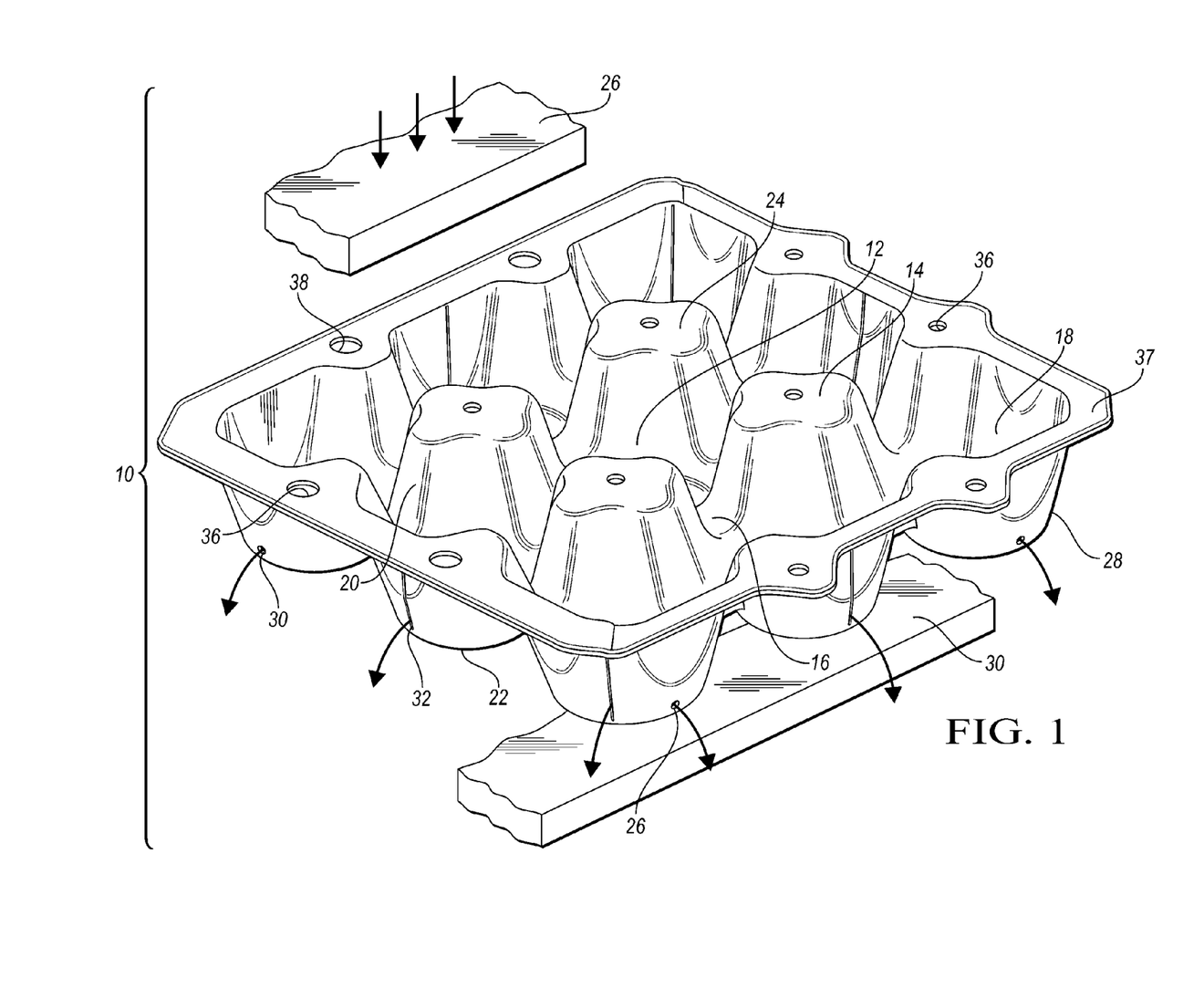
FIG. 1 is a quartering perspective view of a roofing system, including a rain water retention system that is interposed between a roof top and a secondary system on which precipitation falls.
Figure 2:
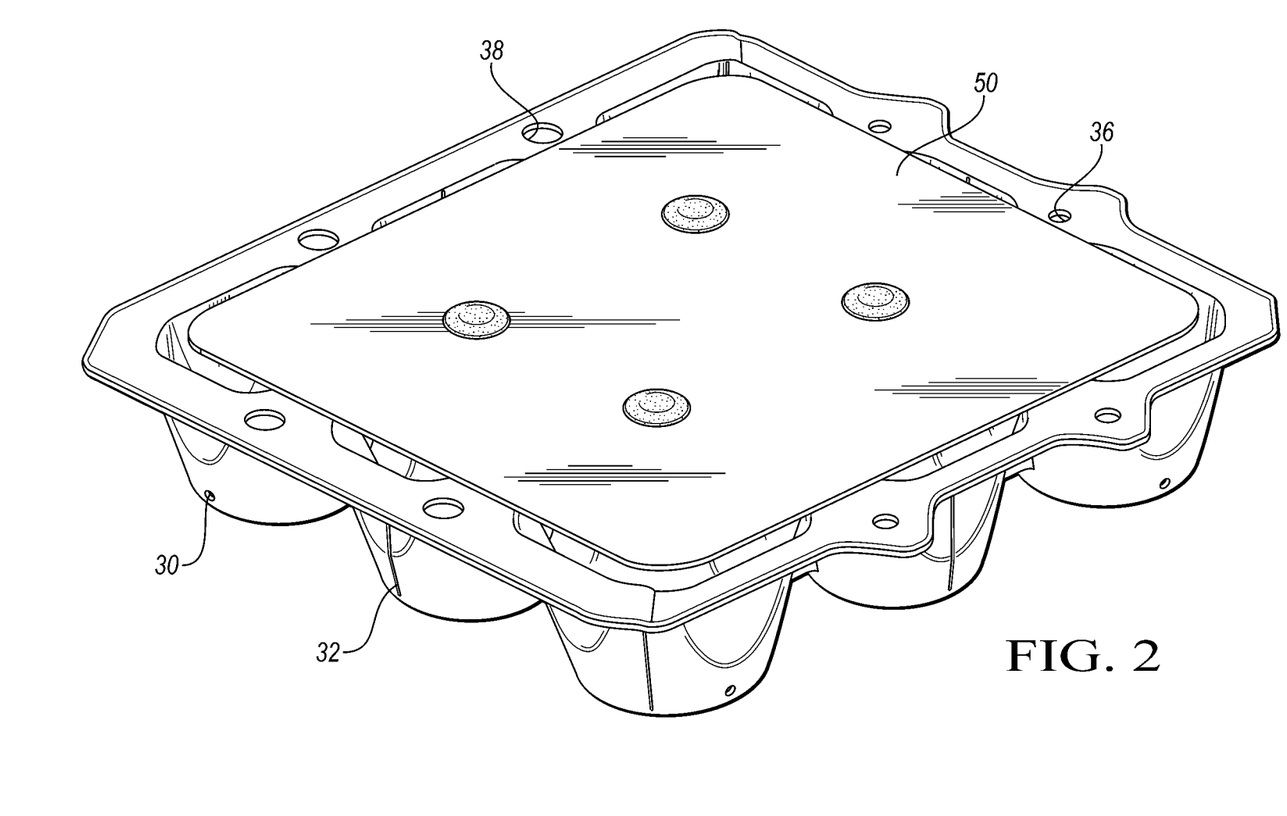
FIG. 2 is a quartering perspective view of the retention system depicted in FIG. 1, with a load supporting layer that is attached to the retention system.
Figure 3:
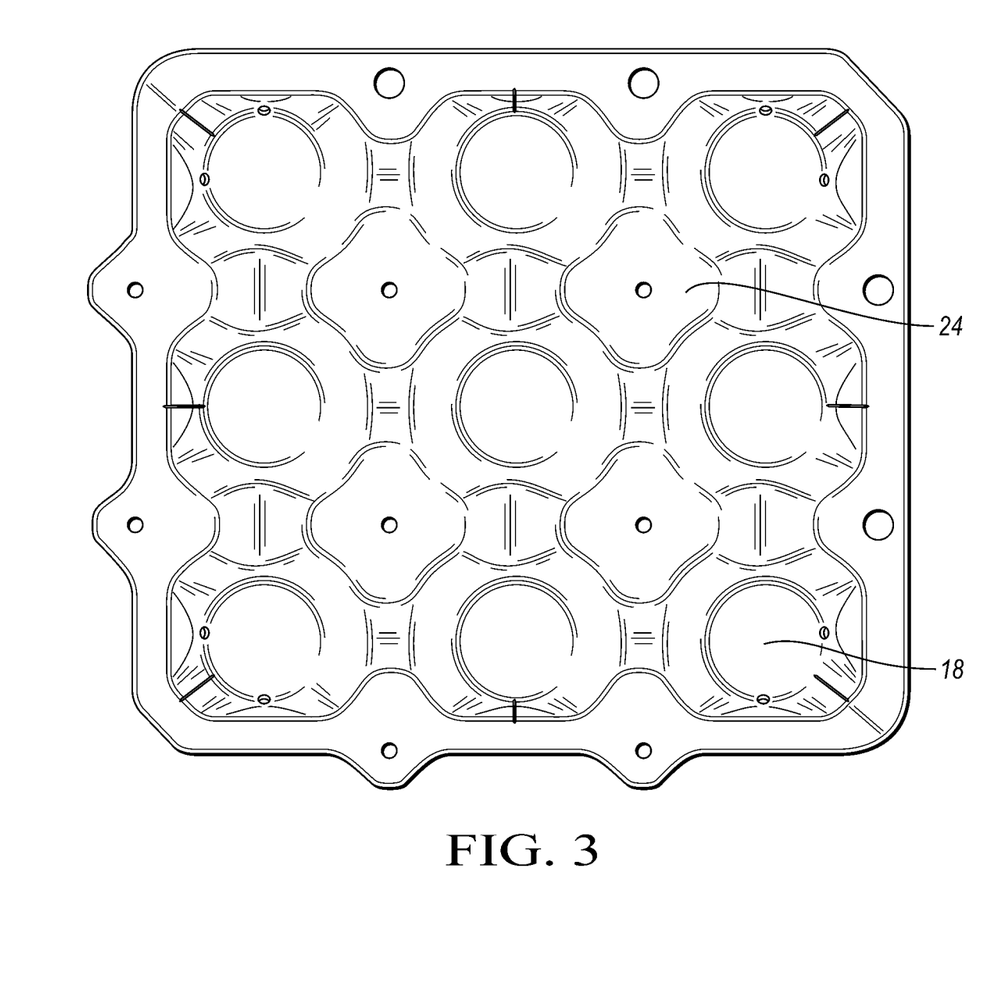
FIG. 3 is a top view of the retention system depicted in FIG. 1.
Figure 4:
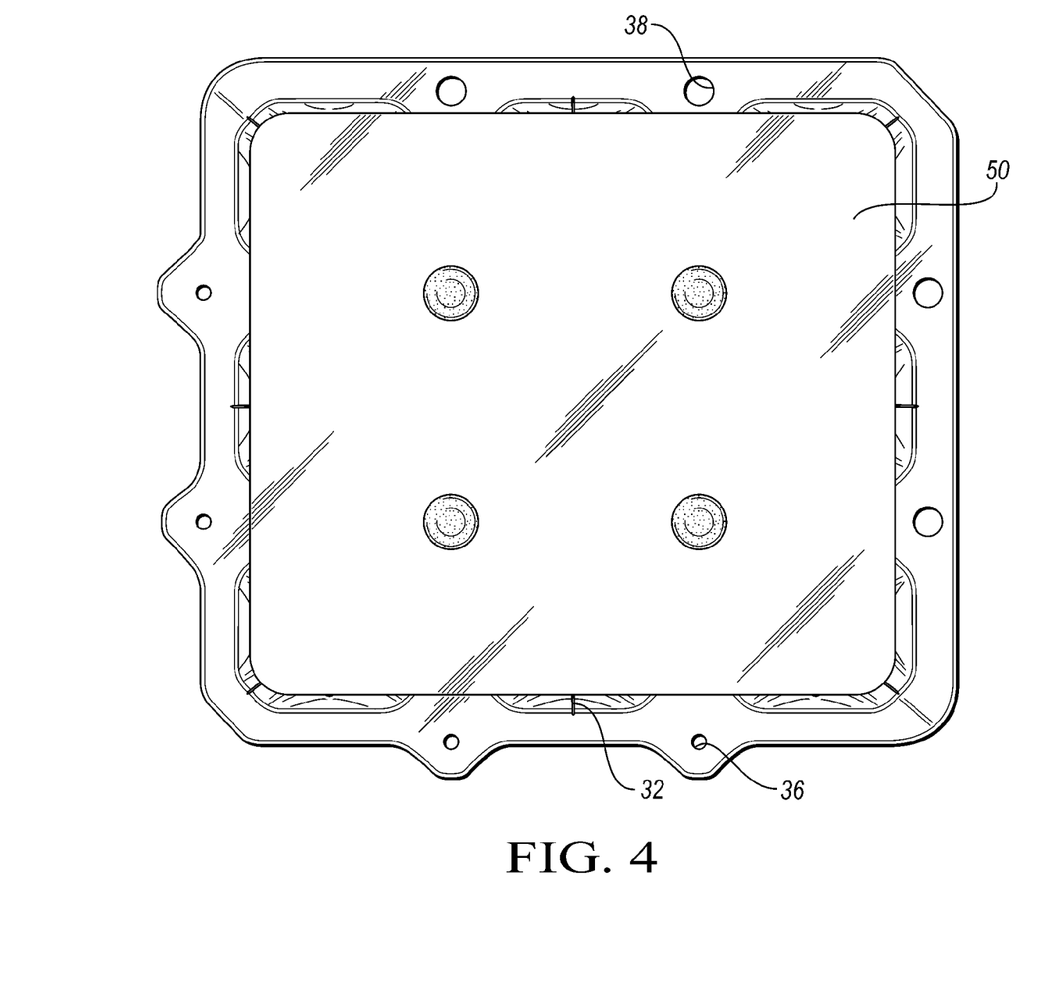
FIG. 4 is a top view of the embodiment depicted in FIG. 2.
Figure 5:
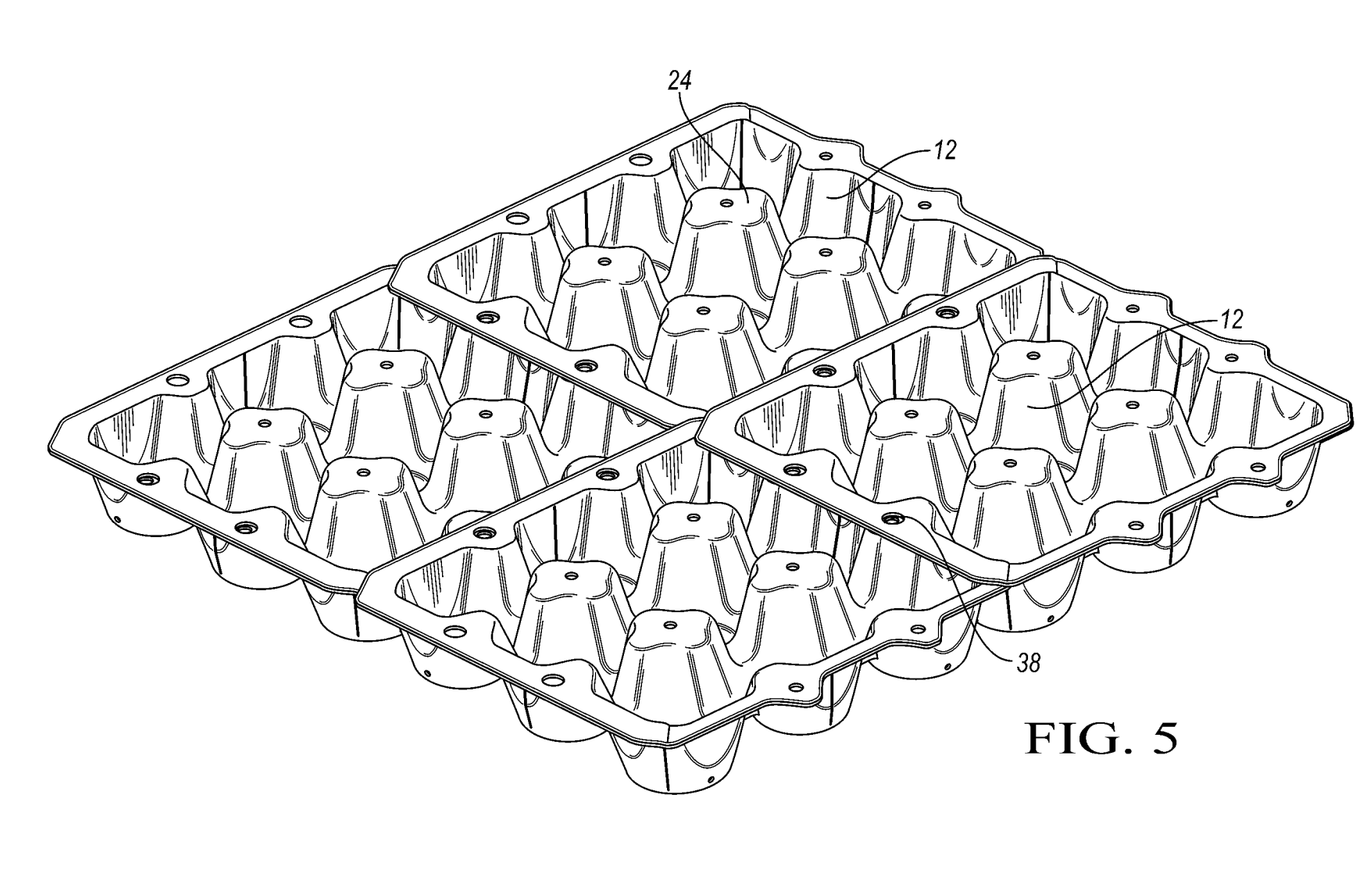
FIG. 5 is a quartering perspective view of a number of modules of the retention system depicted in an interlocking configuration.
Figure 6:
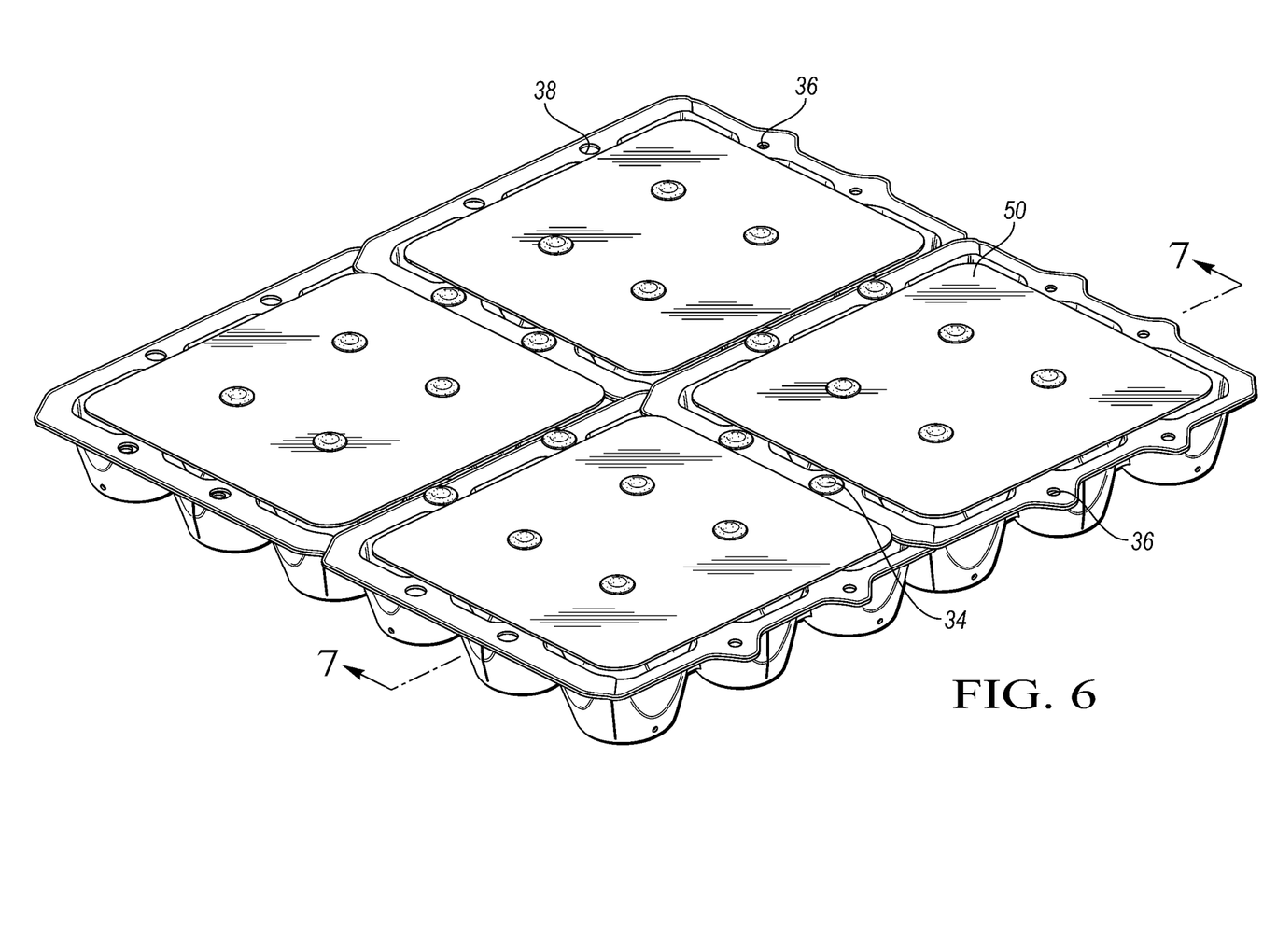
FIG. 6 is a view corresponding to FIG. 5 with load supporting layers attached to at least some retention system modules.

An alternate embodiment includes a load supporting layer 50 which attaches to the tops 24 of the frustoconical structures 14. This layer 50 is affixed to the modules 12 using the same attachments means 34 as described above. The purpose of the layer 50 is to provide a firm feel under foot and distribute weight of for example, precipitation over multiple cone structures 20. The layer 50 also prevents one's foot from sinking into the recesses 18 of the retention modules 12. These layers 50 may or may not be added to the retention modules 12 depending upon roof access and customer requirements.

Once the complete modular retention system 12 has been installed, the system 12 may be covered with a secondary system 26, such as layers of permeable materials like synthetic turf, natural grass, sedum, geotextiles, and the like to create a finished surface that is aesthetically pleasing. If desired, the system can utilize green products in the secondary system.

It will be appreciated that the secondary system 26 can be laid across or secured to one or more modules 12.

One method by which to manufacture the disclosed system is thermoforming. Another is by injection molding. Thermoforming approaches enable easy performance tuning by changing sheet thickness and material type that is thermoformed over the tool. It will be appreciated that thermoforming lends itself to rapid high volume manufacturing and low manufacturing costs. Ideally, a polyolefin thermoplastic, such as a polypropylene copolymer, offers an optimal balance of cost and performance. Additional materials may be compounded into the thermoplastic, such as flame retardant packages, to meet customer building codes or performance criteria.

The system provides water retention capability that minimizes the burden on the municipal waste water treatment facilities during a heavy rain event.

An additional benefit of the disclosed structure is that it provides additional impact protection from hail storms.

Further, the system can be easily and economically be transported to the job site due to the high packaging density (nesting) of the retention 12 and load supporting layers 50.

As a further advantage, the system provides an air gap that lessens the heating and cooling costs for a building on which the rooftop 30 lies.

Besides the above advantages, the system is light in weight and low in cost to manufacture and transport to the job site.

In combination with a surfacing product, the complete installed system is more aesthetically pleasing than traditional roofing materials.

In summary, the disclosed system offers at least these benefits: minimal installed costs; compatibility with impermeable roofing membranes; retention of rainfall; progressive leaching out (release) of rainfall; no additional effluent retention system; some cooling of or insulation provided to the building; overall property appearance enhancement; conformance with building codes and requirements; protection against hail and the elements; little to no maintenance.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A modular precipitation or rain water retention system comprising:
    a water retention module that manages effluent from a precipitation event, the water retention module having a metered drainage provision provided in an exterior sidewall of a module, the metered drainage provision being positioned to retain an initial amount of precipitation and meter out the rain water, the metered drainage provision including one or more of the group consisting of holes, slots, and slits, wherein the slots, slits, or both slits and slots are configured to be openable in response to an applied load,
    the water retention module comprising a plurality of frustoconical support structures joined by hollow interconnecting ribs that create one or more reservoirs so that within each reservoir, wells are defined for precipitation retention, each well having a base, a metered drainage provision also being defined in a wall or a base of a frustoconical support structure; and
    at least some of the frustoconical support structures having tops that underlie a secondary system.

2. The modular precipitation or rain water retention system of claim 1 wherein the base of at least some wells is substantially parallel with the tops of the plurality of frustoconical support structures.

3. The modular precipitation or rain water retention system of claim 1, wherein there are multiple interconnected water retention modules, at least some modules containing a plurality of metered drainage provisions.

4. The modular precipitation or rain water retention system of claim 3, wherein the metered drainage provisions permit rain water to seep onto an underlying surface.

5. The modular precipitation or rain water retention system of claim 1, wherein there are multiple interconnected modules, and adjacent modules coordinate and connect to one another through means for attaching selected from the group consisting of push pin fasteners, rivets, bolts, screws, weldments and adhesives.

6. The modular precipitation or rain water retention system of claim 5 wherein the push pin fasteners are installed through holes defined in a peripheral flange of adjacent modules.

7. The modular precipitation or rain water retention system of claim 6 wherein the peripheral flange of a top module is provided with a clearance hole that is configured to allow for thermal expansion, contraction or both.

8. The modular precipitation or rain water retention system of claim 1, wherein there are multiple interconnected modules, and adjacent modules coordinate and connect to one another through oval female recesses defined in a peripheral flange that engage male protuberances defined in a peripheral flange of an adjacent module.

9. The modular precipitation or rain water retention system of claim 8, wherein the oval female recesses are oriented so that the recesses are aligned with a direction of thermal expansion and contraction, so that when the associated male protuberance is engaged thereby, relative movement therebetween can be accommodated.

10. The modular precipitation or rain water retention system of claim 9, further including lugs and grooves in the male and female members to define a snap-fit engagement mechanism between adjacent modules.

11. The modular precipitation or rain water retention system of claim 1, wherein the modular retention system includes a number (n) of modules, where $1<n<1,000,000$.

12. The modular precipitation or rain water retention system of claim 1, further including a load supporting layer which attaches to one or more of the tops and a peripheral flange of the frustoconical support structures.

13. The modular precipitation or rain water retention system of claim 1, wherein the secondary system positioned above the frustoconical support structures is selected from the group consisting of one or more layers of permeable materials, synthetic turf, natural grass, sedum, geotextiles, environmentally-friendly products and other porous surfaces.

14. A method of manufacturing the water retention system of claim 1 comprising thermoforming a modular precipitation or rain water retention system.

15. The method of claim 14 wherein the thermoforming step includes the step of using a thermoplastic material.

16. The method of claim 15, further including the step of compounding additional materials into the thermoplastic material.

* * * * *